United States Patent [19]

Mawbey

[11] Patent Number: 4,629,248
[45] Date of Patent: Dec. 16, 1986

[54] THIGH SUPPORT FOR VEHICLE SEATS

[75] Inventor: Gerald W. Mawbey, Lake Orion, Mich.

[73] Assignee: General Motors Corporation, Detroit, Mich.

[21] Appl. No.: 740,482

[22] Filed: Jun. 3, 1985

[51] Int. Cl.4 .............................................. B60N 1/02
[52] U.S. Cl. .............................. 297/284; 297/DIG. 1
[58] Field of Search ................. 297/284, DIG. 3, 452, 297/DIG. 1, 224, 433

[56] References Cited

U.S. PATENT DOCUMENTS

| 3,330,598 | 7/1967 | Whiteside | 297/284 |
|---|---|---|---|
| 3,632,166 | 1/1972 | Lohr | 297/284 |
| 3,730,588 | 5/1973 | Braun | 297/284 |
| 3,883,173 | 5/1975 | Shepard et al. | 297/284 X |
| 4,018,477 | 4/1977 | Hogan | 297/284 |

FOREIGN PATENT DOCUMENTS

| 2222532 | 11/1973 | Fed. Rep. of Germany | 297/284 |
|---|---|---|---|
| 2441705 | 11/1976 | Fed. Rep. of Germany | 297/284 |
| 2625277 | 12/1977 | Fed. Rep. of Germany | 297/284 |
| 1199756 | 7/1970 | United Kingdom | 297/284 |

Primary Examiner—Peter A. Aschenbrenner
Attorney, Agent, or Firm—Herbert Furman

[57] ABSTRACT

An inflatable thigh support for a vehicle seat includes an extension which is hinged to the forward edge portion of a seat cushion support for movement between a fully lowered position and a fully raised position and various positions therebetween. The extension is moved between its positions by an inflatable bladder which is secured thereto and to the seat cushion support. A foldable forward portion of the seat cushion overlies the bladder. The inflation of the bladder folds the foldable portion of the cushion as the extension is raised and provides a firm support for the thighs of a seat occupant.

3 Claims, 3 Drawing Figures

THIGH SUPPORT FOR VEHICLE SEATS

This invention relates generally to a thigh support for vehicle seats and more particularly to an inflatable thigh support for a vehicle seat.

Inflatable supports for vehicle seats are well known. Generally such supports comprise bladders located in the back or cushion of the seat and inflatable from a suitable source of pressure fluid to provide a more firm support for various portions of the occupant's anatomy.

The inflatable thigh support of this invention is of this general type and includes an inflatable bladder for providing a more firm support for the thighs of a seat occupant. In the preferred embodiment of the invention, the seat pan or seat cushion support includes an extension. The extension extends transversely of the forward edge of the seat cushion support and has its rearward edge portion hinged to the forward edge portion of the cushion support for movement between a normal lowered first position wherein it generally provides a continuation of the contour of the seat cushion support and a raised second position wherein it is generally folded relative to the seat cushion support. An inflatable bladder overlies the forward edge portion of the seat cushion support and the extension and has spaced edge portions thereof secured to each. A foldable portion of the seat cushion overlies the bladder and the outer covering or trim of the seat overlies the seat cushion. The forward edge portion of the trim or of the extension is resiliently connected to the seat cushion support to provide a downward bias on the extension biasing the extension to its lowered first position.

When the bladder is inflated from a suitable source of pressure fluid, the edge portions thereof secured to the cushion support and extension move toward each other and move or pivot the extension upwardly relative to the cushion support from its first position to its second position. The movement of the extension folds the foldable portion of the seat cushion upon itself and slightly raises this portion above the normal seat contour to provide a firm support for the thighs of the seat occupant. The extent of firmness is controlled by the extent of inflation of the bladder. When it is desired to deflate the bladder, it can be vented to atmosphere and the resilient bias on the seat covering or the extension returns the extension to its lowered or normal first position.

One feature of this invention is that it provides an improved inflatable thigh support for vehicle seats which is operative to provide varying degrees of firm support for the thighs of a seat occupant. Another feature is that the thigh support includes a seat cushion support having a transverse extension hinged to the forward portion thereof for movement from a normal lowered position to a raised position in accordance with the extent of inflation of a bladder which interconnects the extension and the seat cushion support. A further feature is that the seat cushion includes a foldable portion which overlies the bladder and which is both folded and slightly raised upon inflation of the bladder to provide varying degrees of firm support for the thighs of a seat occupant. Yet another feature is that the extension is resiliently biased to the normal lowered position wherein it generally provides a continuation of the seat cushion support.

These and other features will be readily apparent from the following specification and drawings wherein.

Figure 1:
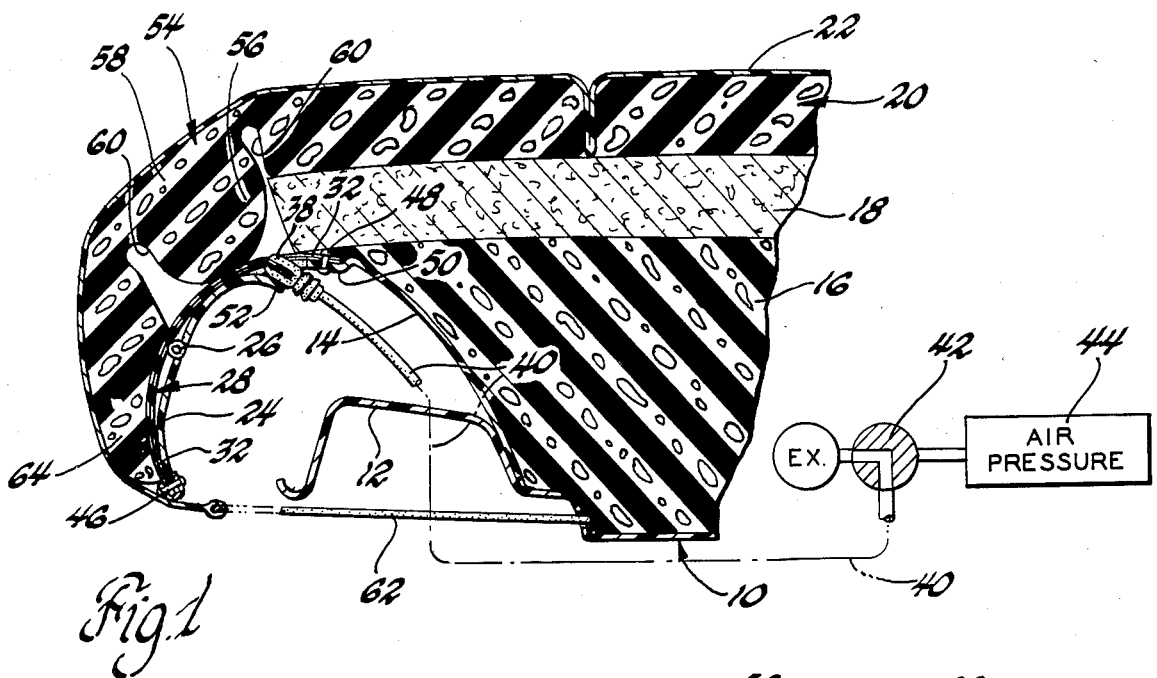
FIG. 1 is a sectional view of the forward edge portion of a vehicle seat cushion embodying an inflatable thigh support according to this invention, with the thigh support being shown in a deflated condition.

The inflatable thigh support of this invention is applicable to any one of a number of well known vehicle seat constructions which generally include a seat pan or seat cushion support, a seat back support which is either fixed to the seat cushion support or pivoted thereto for tilting movement, a cushion covering the cushion support and the back support, and an outer seat covering or trim. In view of these well known seat constructions, the details thereof are not shown in the drawings.

Figure 2:
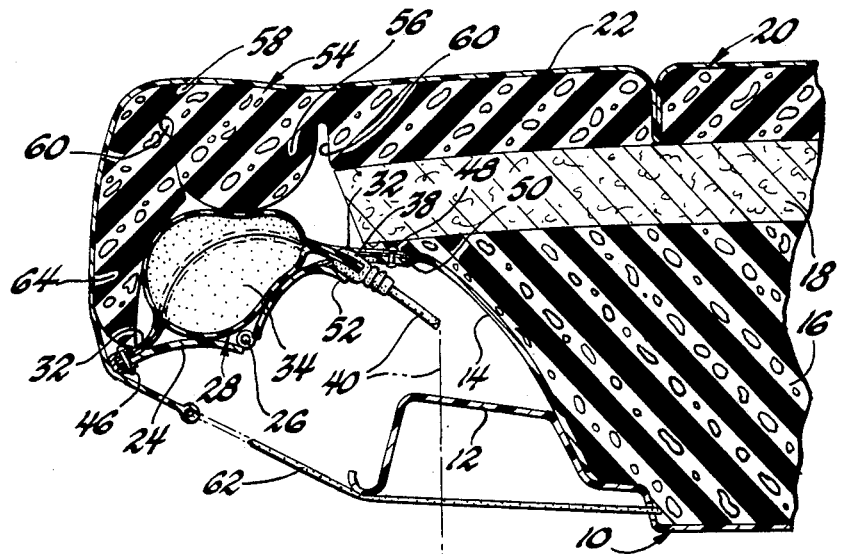
FIG. 2 is a view similar to FIG. 1 showing the thigh support in a fully inflated condition.

Referring now to FIGS. 1 and 2 of the drawings, a conventional vehicle seat includes a seat pan or seat cushion support 10 having a forward transverse reinforcement or front cross bar 12. The cushion support 10 extends rearwardly or to the right as viewed in these figures where it is either joined or pivoted to the seat back support. The cushion support 10 is supported on a vehicle floor pan, not shown, by any one of a number of known seat adjuster structures. The cushion support includes an arcuate upwardly extending forward portion 14 which is rigidly secured to the front cross bar 12. An inner seat cushion or bun 16 of urethane or other suitable foam material seats on the seat cushion support 10 and the portion 14 and may be secured thereto if desired. An intermediate layer of padding 18 covers the bun 16 and an outer seat cushion 20 overlies the padding 18. The outer seat cushion 20 is covered by a seat covering or seat trim 22 of fabric or plastic material secured thereto or formed integral therewith.

The foregoing structure is conventional and in current use on vehicle seats.

A seat cushion support extension 24 extends transversely of the forward edge portion of the portion 14 of the support 10 and is hinged thereto at 26 in a conventional manner, such as by a piano type hinge. The extension 24 is movable between a fully lowered first position shown in FIG. 1 and a fully raised second position shown in FIG. 2. The extension 24 may likewise be located in any position between the fully raised and fully lowered positions as will be further explained. An inflatable bladder 28 overlies the extension 24 and the forward edge portion of the seat cushion support 10.

Figure 3:
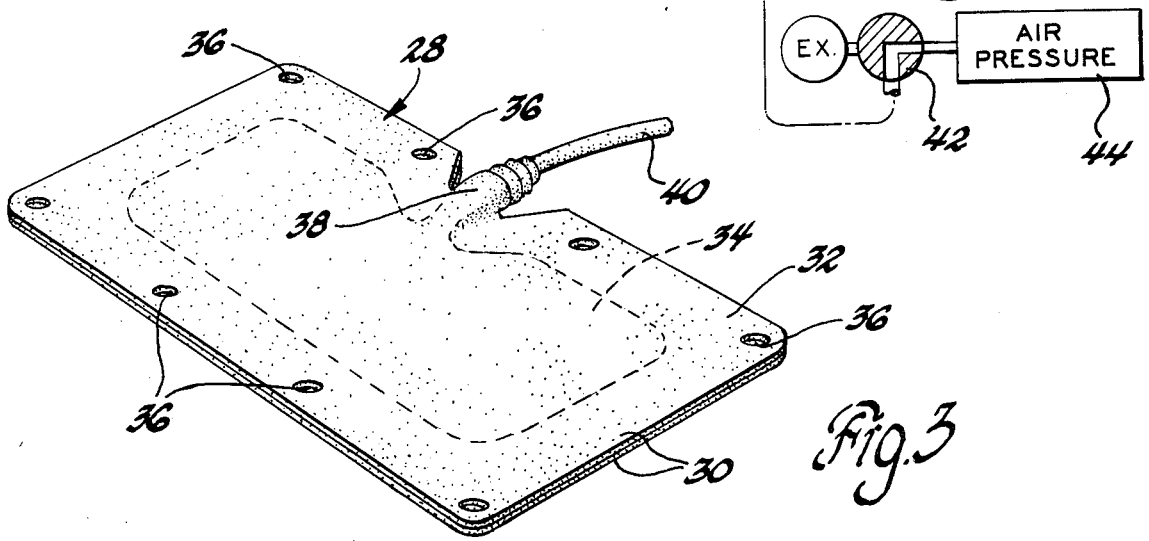
FIG. 3 is a perspective view of the bladder.

As shown in FIG. 3, the bladder 28 is comprised of upper and lower like layers 30 of rubber or similar type material. These layers are joined to each other at their peripheral edge portions 32, outboard of the dash lines shown in FIG. 3, in order to provide an inflatable cavity 34 therebetween. The edge portions 32 are apertured at 36. A portion of each of the layers 30 is formed into a passageway 38 communicating the cavity 34 to a tube 40. Tube 40 and passageway 38 connect cavity 34 to valve 42 and thence to atmosphere or to a source 44 of pressure fluid, preferably air. Valve 42 and source 44 are conventional.

As shown in FIGS. 1 and 2, the forward apertured edge portion 32 of the bladder 28 is riveted at 46 to the forward edge portion of the extension 24 and the rearward apertured edge portion 32 of bladder 28 is riveted at 48 to the seat cushion support 10. The portion of the seat cushion support 10 underlying the rearward edge portion of bladder 28 may be offset downwardly at 50, if desired, for seat comfort purposes. A suitable angled cylindrical passage 52 is provided in the seat cushion support 10 for receipt of the passageway 38. The valve 42 is manually operable by the seat occupant and the source 44 of air pressure can be located anywhere in the vehicle, as desired. The bladder 28 extends over the full width of extension 24, transversely of the seat.

The intermediate layer of padding 18 extends partially over the rearward edge portion of the bladder 28. The outer seat cushion 20 includes a foldable portion 54 which generally comprises a transverse rib portion 56 joined to the outer layer 58 of the seat cushion across integral upwardly extending transverse voids or depressions 60. The outer covering 22 extends around the forward portion of the seat cushion 20 and the forward edge thereof is secured by a number of elastic members or cords 62 to the seat cushion support 10 so as to exert a downward and rearward biasing force on the terminal portion 64 of the outer seat cushion 20 and in turn bias the extension 24 to its fully lowered or first position shown in FIG. 1. Other forms of resilient bias could likewise be used, such as springs at the hinge 26, in order to bias the extension 24 to fully lowered position. In such an instance, the forward edge portion of the covering 22 could be secured to the extension 24.

When the operator actuates the valve 42 to connect the tube 40, passageway 38 and cavity 34 of the bladder with the source 44 of pressure fluid, as shown in FIG. 2, the inflation of cavity 34 distends the bladder 28 as can be seen from a comparison of FIGS. 1 and 2, and shortens the distance beween the forward and rearward edge portions of the bladder 28 at the respective connections 46 and 48 thereof to the extension 24 and seat cushion support 10. This folds or pivots the extension 24 upwardly from its FIG. 1 position to its FIG. 2 position. The engagement of the inflated cavity 34 with the cushion rib portion 56 and terminal portion 64 folds these portions relative to each other across their integral juncture with the outer layer 58 of the seat cushion 20. This folding of the cushion portions 56 and 64 and their consequent slight raising provides a firm support for the thighs of the seat occupant at the forward edge portion of the seat cushion.

The extent of inflation of the bladder is controlled through the valve 42 so that the degree of firmness of the thigh support can be varied at the will of the occupant.

When it is desired to deflate the thigh support, the valve 42 is connected to atmosphere as shown in FIG. 1 to vent the cavity 34 and return the extension 24 to its FIG. 1 position.

Thus this invention provides an improved inflatable thigh support for a vehicle seat.

The embodiments of the invention in which an exclusive property or privilege is claimed are defined as follows:

1. In a vehicle seat, the combination comprising, a seat cushion support having a forward edge portion, a seat cushion support extension extending transversely of the forward edge portion of the cushion support, hinge means securing the support extension to the forward edge portion of the cushion support for movement between a lowered first position and a raised second position, an inflatable bladder including upper and lower layers having peripheral edge portions secured to each other to define a normally collapsed inflatable cavity, the bladder extending over and abutting the hinge means, the cushion support and the support extension, means securing a first peripheral edge portion of the bladder to the cushion support, means securing a second peripheral edge portion of the bladder to the support extension, a seat cushion extending over and abutting the upper layer of the bladder, and means for inflating the inflatable cavity of the bladder, inflation of the inflatable cavity of the bladder (1) moving the upper layer of the bladder upwardly to raise the seat cushion and provide support for the seat occupant's thighs, and (2) moving the second peripheral edge portion of the bladder toward the first peripheral edge portion to move the support extension from its lowered first position to its raised second position as the seat cushion is raised.

2. In a vehicle seat, the combination comprising, a seat cushion support having a forward edge portion, a seat cushion support extension extending transversely of the forward edge portion of the cushion support, hinge means securing the support extension to the forward edge portion of the cushion support for movement between a lowered first position and a raised second position, means biasing the support extension to the lowered first position, an inflatable bladder including upper and lower layers having peripheral edge portions secured to each other to define a normally collapsed inflatable cavity, the bladder extending over and abutting the hinge means, the cushion support and the support extension, means securing a first peripheral edge portion of the bladder to the cushion support, means securing a second peripheral edge portion of the bladder to the support extension, a seat cushion extending over and abutting upper layer of the bladder, and means for inflating the inflatable cavity of the bladder, inflation of the inflatable cavity of the bladder (1) moving the upper layer of the bladder upwardly to raise the seat cushion and provide support for the seat occupant's thighs, and (2) moving the second peripheral edge portion of the bladder toward the first peripheral edge portion to move the support extension from its lowered first position to its raised second position against the biasing means as the seat cuchion is raised.

3. In a vehicle seat, the combination comprising, a seat cushion support having a forward edge portion, a seat cushion support extension extending transversely of the forward edge portion of the cushion support, hinge means securing the support extension to the forward edge portion of the cushion support for movement between a lowered first position and a raised second position, an inflatable bladder including upper and lower layers having peripheral edge portions secured to each other to define a normally collapsed inflatable cavity, the bladder extending over and abutting the hinge means, the cushion support and the support extension, means securing a first peripheral edge portion of the bladder to the cushion support, means securing a second peripheral edge portion of the bladder to the support extension, a seat cushion including an outer layer having a terminal portion seating on the support extension and an adjacent rib portion integrally hinged to the terminal portion and abutting the upper layer of the bladder, and means for inflating the inflatable cavity of the bladder, inflation of the inflatable cavity of the bladder (1) moving the upper layer of the bladder upwardly to raise the rib portion of the seat cushion and provide support for the seat occupant's thighs, and (2) moving the second peripheral edge portion of the bladder toward the first peripheral edge portion to move the support extension from its lowered first position to its raised second position and fold the terminal portion relative to the rib portion about the integral hinge.

* * * * *